N. W. HARTMAN & J. P. GOGGIN.
GUIDE FOR BLOW IRONS.
APPLICATION FILED OCT. 9, 1909.
1,098,724.
Patented June 2, 1914.
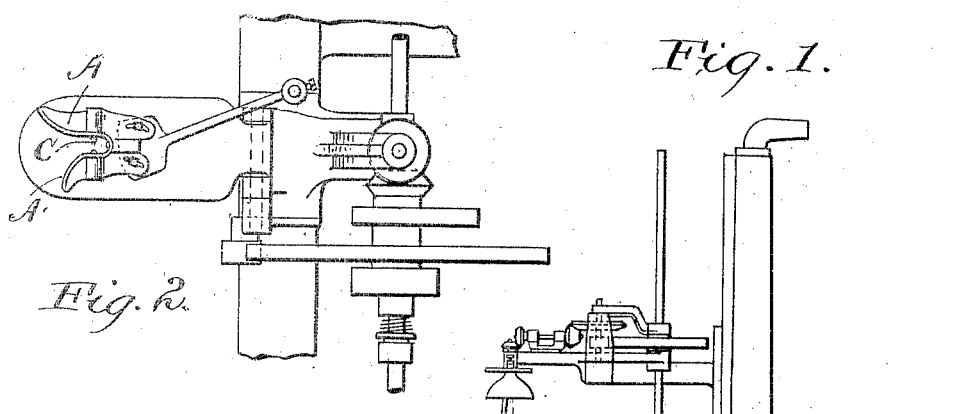
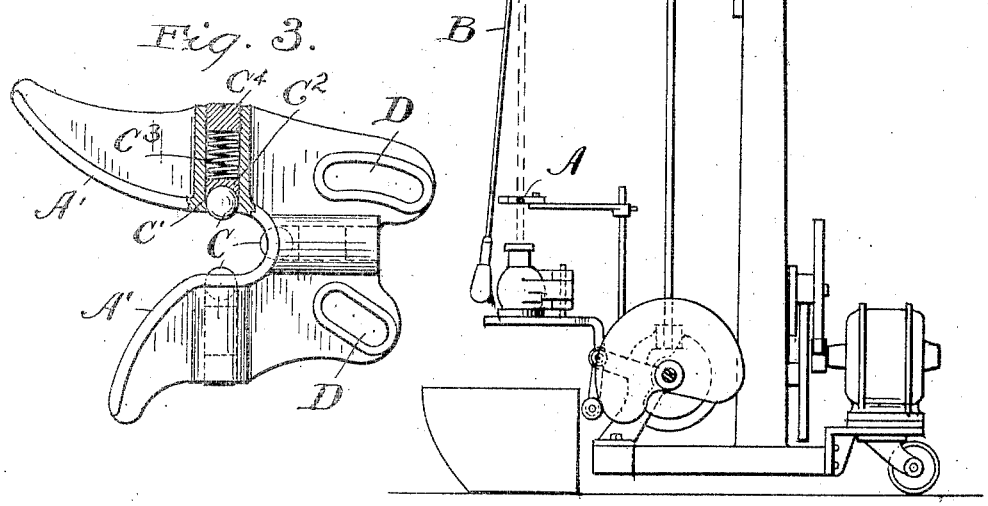

UNITED STATES PATENT OFFICE.

NOBLE W. HARTMAN, OF TOLEDO, AND JAMES P. GOGGIN, OF FOSTORIA, OHIO, ASSIGNORS, BY MESNE ASSIGNMENTS, TO GENERAL ELECTRIC COMPANY, A CORPORATION OF NEW YORK.

GUIDE FOR BLOW-IRONS.

1,098,724.

Specification of Letters Patent.

Patented June 2, 1914.

Application filed October 9, 1909. Serial No. 521,831.

*To all whom it may concern:*

Be it known that we, NOBLE W. HARTMAN and JAMES P. GOGGIN, citizens of the United States, and residents, respectively, of Toledo, in the county of Lucas and State of Ohio, and Fostoria, in the county of Seneca and State of Ohio, have invented a certain new and useful Improvement in Guides for Blow-Irons, of which the following is a full, clear, and exact description.

The present invention relates to glass blowing machinery and is more particularly directed to means for centering and retaining in position the blow iron when the latter is placed in operative position in the machine.

The object of the invention has been to provide means which shall be capable of accurately positioning the iron, permit it to operate freely while in position and into and from which the iron may be inserted and withdrawn with ease and rapidity.

The above object it will be seen is attained by that embodiment of our invention described in the following specification and illustrated in the accompanying drawings, in which;

Figure 1 is an elevation of an automatic glass blowing machine illustrating the relative position of the blowing head, the mold and our positioning guide. Fig. 2 is a plan view of the guide and associated parts. Fig. 3 is a plan view of the guide, partly in section. Figs. 4 and 5 are respectively a side elevation and a central vertical section.

In the operation of automatic machinery for blowing glass articles it has been found that the most convenient arrangement of parts is to have a blowing head operating vertically above a mold platform on which the molds are placed. A machine belonging to this generic type is illustrated in Hartman's prior Patent No. 813,289, granted February 20, 1906. The blow iron is thrust into the blow heads where suitable automatic mechanism, as described in Hartman's prior patent, grips it, while the lower end swings in immediately over the mold so that the bead on the lower end of the iron is inclosed in the mold during the blowing operation. Some suitable mechanism controlling the blow head admits air under pressure to the blow iron while the gripping means for holding the iron is given a rapid rotation. Such mechanism is old, as shown in the patent referred to. We have devised in addition to this general arrangement a positioning and retaining guide A for the lower portion of the blow iron B by means of which the lower end of the iron may be accurately centered with respect to the mold and retained in proper position throughout the operation. The specific means which we have here illustrated for that purpose comprises a forked casting with a sufficiently wide sloping space between the legs A' of the fork to permit the iron to be swung into position hastily and without care on the part of the operator. The sloping sides of the fork terminate at their inner end into a sort of crotch pocket having a slightly greater diameter than the standard gage of the blow irons. About this pocket portion of the fork are three anti-friction balls C held in suitable sockets C' in the fork under spring pressure. The detail arrangement for holding these anti-friction balls is shown in Fig. 3 and Fig. 5. In these figures it will be seen that the retaining sockets C' for the balls extend through the casting and have threads at their outer ends, being tapered at their inner ends sufficiently to permit the ball to be retained in place but to project a slight distance beyond the inner wall of the pocket in which the blow iron is held. The tapered end of these ball sockets is preferably machined so as to give the ball a good smooth bearing, and a follower $C^2$ behind the ball is pressed forward by a coil spring $C^3$ held in a bearing in its rear end against a threaded screw $C^4$ in the outer end of the socket. Several of these balls, preferably at least three as shown, are disposed around the pocket on the guide in which the stem of the blow iron hangs. Being held under spring pressure, the balls about the mouth of the pocket yield when the blow iron is thrust between them and snap back into position when the iron is in place. Disposed in the manner shown they surround the blow iron and retain it in place giving it an anti-friction bearing. On account of the fact that one or more of these balls extends out into the mouth of the pocket, the iron will be retained therein until positively pulled therefrom by the operator.

The practical advantages of this form of positioning device it is thought are clear from the above description and it will be seen that the object of invention is attained since the blow iron may be moved quickly into and out of the guide without any care on the part of the operator and yet be held securely in place without imposing any friction on the iron during the blowing operation. The fork further may be adjusted to any desired position over the mold platform, in order to accommodate itself to the different sizes of molds placed thereon, by means of slots D in the web of the fork, one of which is in the form of an arc struck from a center within the other slot. By this means the fork may be positioned upon a sustaining plate through the medium of bolts extending through said plate and through the slots and adjusted so as to properly accommodate the blow iron to the different sizes of mold used.

Having described our invention, we claim:

1. A guide for blow irons comprising a fork having an internal dimension greater than the gage of the blow iron to be used in connection therewith, an anti-friction device mounted in the crotch of said fork and anti-friction balls positioned in the path of the blow iron at the mouth of the fork, in sockets having retaining means for limiting the outward thrust of the balls and yielding means for pressing at least one of the balls to its outermost position.

2. A guide for blow irons comprising a fork with inwardly sloping sides converging in a pocket of greater diameter than the blow irons with which it is to be used, said pocket being provided with a plurality of anti-friction balls arranged in sockets having retaining means for limiting the outward thrust of the balls, at least one of said balls being arranged at the bottom of said pocket, and at least two of said balls being arranged opposite each other at the mouth of the pocket, at least one of the said two balls being yieldingly pressed to its outermost position so that when the blow iron is thrust sidewise into the fork it will be yieldingly retained in position by them.

In testimony whereof, we hereunto affix our signatures in the presence of two witnesses.

NOBLE W. HARTMAN.
JAMES P. GOGGIN.

Witnesses:
E. B. GILCHRIST,
H. R. SULLIVAN.